United States Patent [19]
Duran

[11] 3,885,242
[45] May 20, 1975

[54] METHOD OF AND APPARATUS FOR PRODUCING PHOTOGRAPHIC VIGNETTES

[76] Inventor: Jack Duran, 25226 Soto Rd., Hayward, Calif. 94544

[22] Filed: Nov. 12, 1973

[21] Appl. No.: 414,663

[52] U.S. Cl. .................................. 354/296; 355/71
[51] Int. Cl. ........................................... G03b 11/06
[58] Field of Search ......... 95/1, 65; 355/71; 350/58; 354/296

[56] References Cited
UNITED STATES PATENTS

| | | | |
|---|---|---|---|
| 425,812 | 4/1890 | Lloyd | 95/65 |
| 2,197,184 | 4/1940 | Kemp | 350/58 |
| 2,437,159 | 3/1948 | Herbert | 95/18 |
| 3,577,898 | 5/1971 | Bragg | 355/71 |
| 3,774,992 | 11/1973 | Steiner | 354/296 |

*Primary Examiner*—John M. Horan
*Attorney, Agent, or Firm*—Joseph B. Gardner; Theodore J. Bielen, Jr.; Richard E. Peterson

[57] ABSTRACT

The invention disclosed is a method of and apparatus for producing photographic vignettes — a vignette being a photograph that shades off gradually into a generally diffused or blurred area surrounding the subject of the photograph. The method includes focusing a camera on a subject so that incident light therefrom enters the image-forming aperture of the camera and is directed thereby toward the focal plane of the camera to expose a photographic film disposed thereat. Incident light traveling from the vicinity of the subject toward the aperture of the camera is divided into primary and secondary fields the latter of which may have refractive and reflective components. The primary field of the incident light appears at the image-forming aperture substantially unchanged, but the secondary field is changed in character prior to its reaching the aperture either to provide a diffusion of light recorded on the film as a shaded area of indistinct imagery surrounding the subject of the photograph, thereby producing a photographic vignette, and/or to provide special effects on the film. The apparatus includes an elongated hollow tube of cylindrical configuration having a translucent wall permitting light to pass therethrough in a diffused state to constitute the refractive component of the secondary field of incident light. The tube is open and equipped at one end with an adaptor by means of which it is removably secured to a camera adjacent the image-forming aperture thereof so that the primary field of incident light passes through the interior of the tube without being substantially influenced thereby in reaching the aperture of the camera. The refractive component of the secondary field of light intercepted by the tube and passed through the cylindrical wall thereof as diffused light is recorded on the photographic film as a shaded or generally blurred area surrounding the main subject of the photograph. The reflective component of the secondary field may enter the tube through the outer open end thereof and be reflected from the inner surface and recorded on the film as light halos or as other special effects.

12 Claims, 8 Drawing Figures

METHOD OF AND APPARATUS FOR PRODUCING PHOTOGRAPHIC VIGNETTES

This invention relates to the art of photography and, more particularly, to the art of taking pictures by use of a camera to expose photographic film contained therein. In even greater particularity, the invention is directed to a method of and apparatus for taking photographic vignettes and the like.

In certain instances, photographs in which the areas generally surrounding the main photographic image or subject of the picture are indistinct and shade gradually into the surrounding background are considered aesthetically satisfying, and on occasion such photographs have the practical advantage of obscuring environmental objects adjacent the main subject which, if present in the photograph, detract therefrom. Photographs of this type are known as "misties" or vignettes, and recently have become quite popular especially for wedding photographs. Conventionally, photographic vignettes can be produced either during printing of positive reproductions from the photographic negatives as a laboratory technique, or at the time that the photograph is taken by applying a foreign substance such as water or vasoline to the lens of the camera. In the latter instance, it will be apparent that the foreign coating on the lens will intercept at least a portion of the incident light and blur or diffuse the same to provide the shaded areas directly on the photographic film negative.

The difficulty with producing photographic vignettes as a part of the picture-taking procedure is that the entire photograph may be diffused which results in a blurring of the subject that it is desired to record sharply unless considerable care is taken in smearing the substance onto the lens of the camera. Additionally, it is necessary to carefully clean the camera lens after treating the same in such manner which not only is time consuming and somewhat messy but creates the likelihood of the lens being scratched or otherwise damaged. Moreover, it will be apparent that such technique prevents rapid changeover of the camera between the vignette-taking mode and the ordinary picture-taking mode which often results in the loss of excellent candid-type photographs when a transient scene presents itself during the lens-cleaning procedure.

In view of the foregoing, a general object of the present invention is to provide an improved method of and apparatus for taking photographic vignettes and the like.

Further objects, among others, of the present invention are in the provision of a vignette-producing device that can be removably secured to a camera quickly and easily to convert the same from a normal picture-taking mode to a vignette-taking mode and vice versa; a device of the character described that is hollow and equipped at one end thereof with attachment means enabling the same to be removably secured to a camera adjacent the image-forming aperture thereof; a device that is light-transmitting and particularly translucent in at least certain forms thereof so that light incident thereon passes through the walls of the tube and is diffused or otherwise influenced thereby; a device which may have light-interferring markings thereon such as helical grooves, axial striations, serrations, etc. so as to intercept and influence light incident thereon and thereby produce special vignette effects on photographic film exposed in a camera using the device; and in the further provision of a method of taking photographic vignettes and the like in which a camera is focused on a subject, incident light traveling from the vicinity of such subject toward the image-forming aperture of the camera is divided into primary and secondary fields the latter of which has a component bounding the former and merging therewith, and in which the incident light forming the secondary field is diffused or otherwise changed in character prior to its reaching the image-forming aperture of the camera in a manner to produce a vignette effect in film exposed to incident light from the secondary field.

Additional objects and advantages of the invention, especially as concerns particular features and characteristics thereof, will become apparent as the specification continues.

Embodiments of the invention are illustrated in the accompanying drawings, in which.

Figure 1:
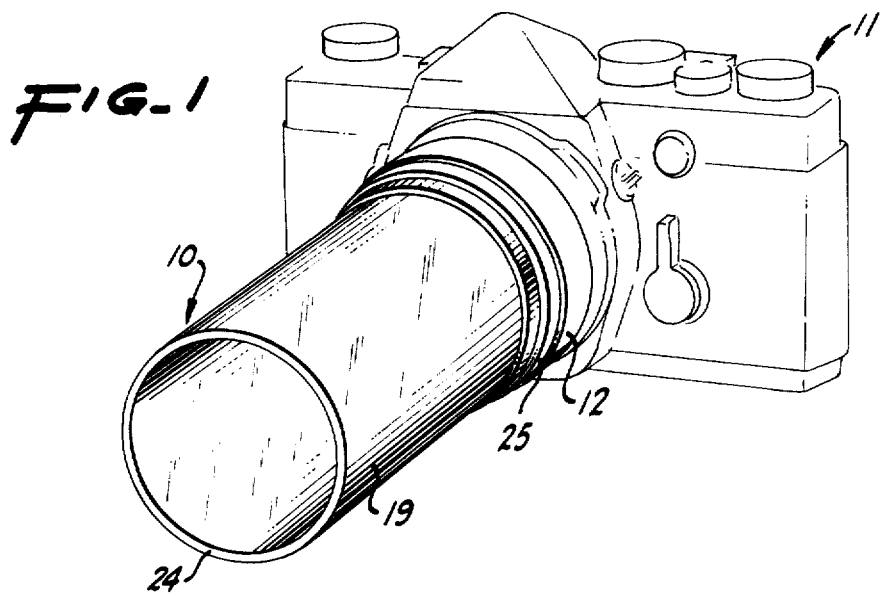
FIG. 1 is a perspective view of a photographic camera having the vignette-producing device attached thereto.
Figure 2:
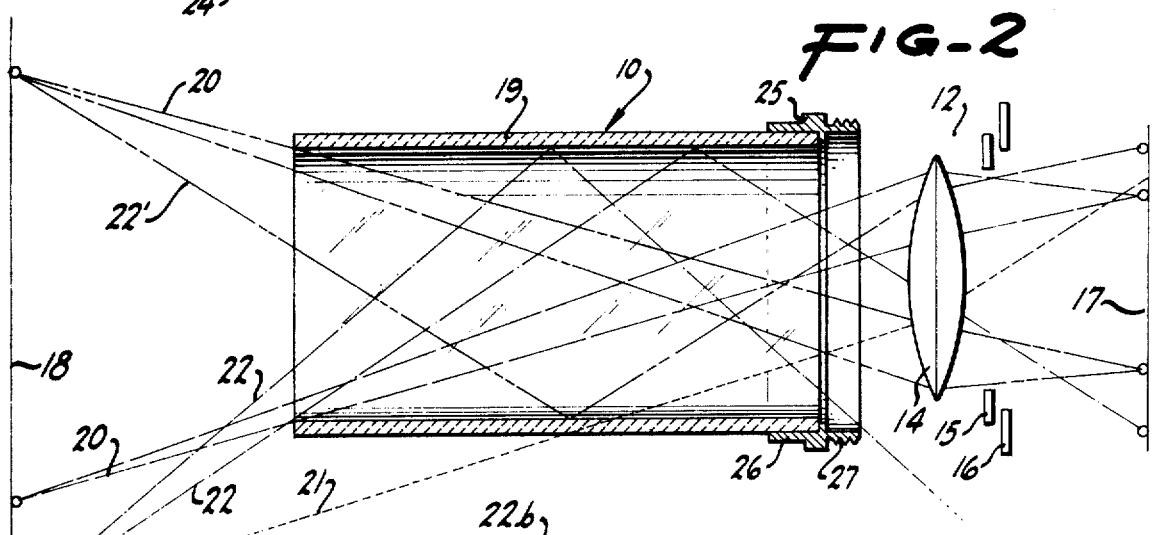
FIG. 2 is a longitudinal sectional view through such device illustrating the same in functional association with optical parameters of a camera and photographic subject, all of which are depicted in phantom.

One form of the device for producing photographic vignettes is illustrated in FIG. 1 in attachment to a conventional photographic camera. For specific identification, the device shown in FIG. 1 is denoted in its entirety with the numeral 10, and the exemplifying camera is designated with the numeral 11. As respects the present invention, the camera 11 may be completely conventional, and it includes the usual image-forming aperture 12 through which incident light is directed toward the focal plane of the camera to expose a photographic film disposed thereat. The image-forming aperture usually includes a lens assembly having an adjustable light stop, and also having an adjustable shutter so that the length of exposure of the film can be selected in accordance with the particular film being used and light conditions all with respect to the particular adjustment of the light stop. In FIG. 2, the image-forming aperture 12 is generally denoted, and it is shown to include an objective lens 14, an adjustable light stop 15, and a shutter 16. The focal plane of the camera is depicted by a segment of a photographic film 17 disposed at such focal plane, and a subject on which the aperture 12 is focused is depicted in FIG. 2 at 18.

As previously stated, the camera 11 may be completely conventional, and it may be any type or style of camera although a single-lens reflex camera is most desirable because it provides at the viewing aperture the exact scene to be recorded by the camera. By way of particular example, the camera 11 may be a Hasselblad 500C (made in Sweden by Victor Hasselblad) equipped with a planar F2.8 80 millimeter lens manufactured in Germany by Carl Zeiss.

As seen in FIG. 2, the device 10 includes an elongated hollow tube 19 effective to divide incident light from the vicinity of the subject or image plane 18 into primary and secondary fields. In FIG. 2, the primary field is generally bounded by incident light rays 20 shown to emanate from point sources along the subject 18, and this field passes essentially through the interior of the tube without being influenced thereby to reach the aperture 12. In contradistinction, the secondary field is influenced in some manner by the tube 19 prior to reaching the camera aperture 12. The secondary field may be quite complex both in terms of its origin and interaction with the tube 10, but in any case it is intercepted by the tube which then influences or changes the character thereof.

Two components of the secondary field are represented pictorially in FIG. 2 in very general and greatly over-simplified geometric terms, and such components include one that generally emanates from locations lying outside of the primary field 20, 20 such as the light rays shown to originate from a point source in the vicinity of the subject 18. One bundle of light from the point source in this secondary field is indicated by the ray 21 and passes through the wall of the tube 19 in the path of travel of such ray toward the lens 14, and may be conveniently referred to as the "refractive" component of the secondary field. Another component of the secondary field is in the nature of reflected light as indicated by the rays 22 and 22' which enter the tube 19 through the outer open end thereof and are reflected, at least in part, from the interior of the tube 19.

This secondary field component may be referred to as the "reflective" component, and the light rays may emanate either from inside or outside of the primary field (the rays 22' and 22, respectively) usually as a specific light source. In the case of the tube 19 having an arcuate reflective surface, the reflection therefrom will be very complex and not singular in direction. One of the reflected rays 22 is shown to be seen or intercepted by the lens 14, whereas the other such ray 22 is lost in the fringes of the lens because of its angle of incidence on the wall of the tube 19.

The tube 19 may take variant forms, and in the embodiment thereof shown in FIGS. 1 and 2, it is a cylindrical tube having a cross-sectional area greater than that of the aperture 12 to enable the tube to be disposed in surrounding relation therewith, as depicted in both FIGS. 1 and 2. The tube 19 may have other cross-sectional configurations, however, such as square-shaped, oval, tapered (i.e., frustoconical or frustopyramidal), etc. The tube 19 is also light-transmitting to enable the secondary field of incident light generally bounding the primary field to pass through the walls of the tube to be diverted or otherwise influenced thereby. In the particular form shown, the tube 19 is translucent, and it may be clear or color tinted. In this latter respect, the tube may be tinted red, amber, yellow, blue, green, etc., and a color-tinted tube, if used, may be selected to blend with the background color of the subject to enhance the same much as a colored lens filter is used in ordinary photographic work.

Although in FIG. 2 the secondary rays 21 are shown as passing directly through the translucent wall of the tube 19 without deviation from a straight-line path, it will be appreciated that the light rays will be refracted in passing through the sidewalls of the tube and thereby deviated from a straight-line path. Further as respects the configuration of the tube 19, the outer open end may have the edge thereof tapered to a point, rounded slightly to provide an arcuate terminus, or otherwise shaped to influence the character of the secondary field, as will become apparent hereinafter.

The device 10 further includes attachment means 25 adjacent the inner end of the tube 19 for removably securing the same to the camera 11 adjacent the image-forming aperture 12 thereof. The orientation of the tube 19 effected by such attachment means as respects the aperture 12 is such that the primary field of incident light passes through the interior of the tube without substantial influence therefrom to reach the aperture and be reproduced therethrough as an essentially high fidelity replica of the subject 18 at the film 17, all as previously explained. In the form shown, the attachment means 25 constitutes an adaptor fixedly secured to the tube and equipped with appropriate means for removably interconnecting the same with the camera 11. It will be apparent, that the particular type of adaptor employed, and particular type of any attachment means 25, will depend upon the requirements of any specific camera 11 with which the device 10 is used. As illustrated in FIG. 2, the adaptor has a cylindrical collar 26 that telescopically receives the inner end of the tube 19 therein, and the collar is adhesively secured to the tube. The adaptor also is equipped with external threads 27 adapted to be threadedly received within an opening provided with complementary threads for this purpose in generally surrounding relation with the aperture 12.

Evidently, the attachment means 25 necessarily takes the form required by the associated camera 11 and, in this respect, may be equipped with a bayonet-type releasable fastener, resilient clips, etc. In some instances, the attachment means may be integral with the tube 19 and, for example, constitute resilient spring leaves provided adjacent the inner end of the tube by slotting the same so as to enable such leaves or fingers to resiliently grip the camera to releasably attach the device 10 thereto. By way of specific example referenced to the aforementioned Zeiss planar lens, a 57 bay 7, series 7, Tiffen adaptor ring may be used, and it can be adhesively or otherwise secured to the tube 19.

A great number of variations may be made in the tube 19 for the purpose of obtaining special vignette-type effects. In this reference, the outer and/or inner surface of the tube 19 may be provided with light-interfering markings thereon. For example, the outer surface of the tube 19 may be generally roughened to further increase its translucency toward a reduction in light transmission therethrough, it may be serrated, equipped with grooves and channels, etc. Typifying instances of such variations are respectively illustrated in FIGS. 4 and 6. Since the modified forms of the device illustrated in these figures are generally the same as the device 10 heretofore described, the same numerals are used to identify respectively corresponding components except that differentiation is maintained by the addition of the suffixes "a" and "b" FIGS. 4 and 6.

Figure 4:
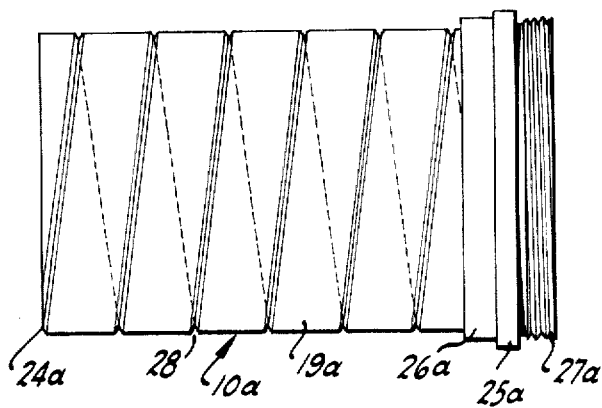
FIG. 4 is a side view in elevation of a modified device.

In the device 10a shown in FIG. 4, the outer surface of the tube 19a is provided with an axially extending helical groove 28 initiating adjacent the outer end 24a of the tube and terminating adjacent the inner end thereof confined within the collar 26a of the attachment means 25a. In the tube 19b illustrated in FIG. 6, configurations are also provided along the outer surface of the tube 19b, and the light-interfering markings take the form of angularly spaced, axially extending grooves or striations 29 cut or otherwise provided in the outer surface of the tube and projecting therealong from the outer end 24b to the inner end thereof telescopically confined within the collar 26b of the attachment means 25b. As previously indicated, an almost infinite variety of surfacing configurations, textures, etc., may be provided along the tubes depending upon the type of effect desired.

The device 10 is effective to produce a photographic vignette with the photograph shading off gradually into the surroundings. The subject or portion thereof which it is desired to capture on the photograph remains perfectly clear — a high fidelity and faithfully reproduced replica of the subject. As well as shading or fading gradually into the surroundings, vignettes produced in accordance with the present invention may also tend to accent the subject of emphasis by forming one or more halos or bands of light-emphasis thereabout either generally along or outside of the mergence of the clear center portion of the photograph with the muted or diffused surroundings thereof. This latter result is attained with emphasis when one or more sources of light are located forwardly of the outer edge 24 of the tube although such light source may be offset angularly from the axis of the tube by 45° or more. The angular offset of any such light source from the axis of the tube 19 appears to be critical, and the factor that seems to be of significance is that the source be located so that at least some of the light rays therefrom enter the open outer end of the tube at an angle causing them to be incident on the inner surface of the tube and be reflected thereby. The camera lens then sees such reflection and focuses the same on the film 17.

Figure 3B:
FIG. 3B is a representation of the same photographic subject with the device attached to the camera, as shown in FIG. 1.
Figure 3A:
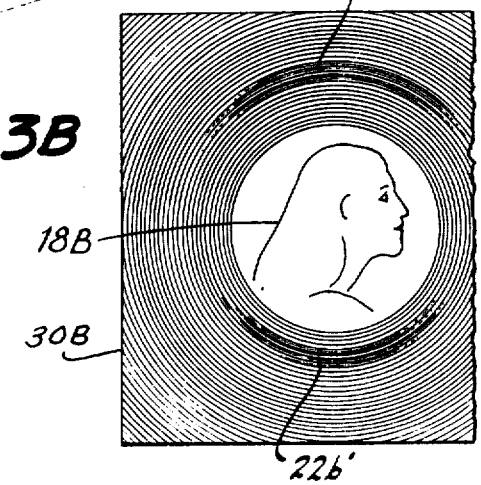
FIG. 3A is a representation of a photograph taken of a particular subject without the vignette-producing device being used.
Figure 3A:
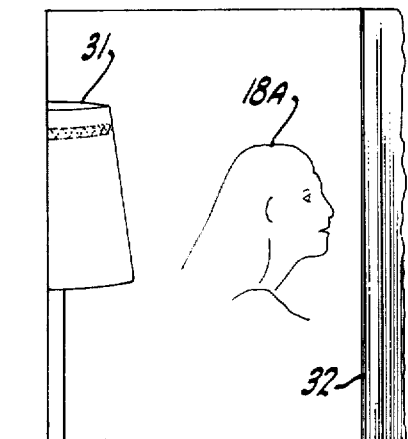

Referring now to FIGS. 3A and 3B, the first illustrates a photograph taken by the camera 11 without the device being attached thereto. The photograph is designated with the numeral 30A, and the image 18A is located at the central portion thereof. Along the left-hand edge of the photograph 30A is a lamp 31, and along the right-hand edge portion of the photograph is a drapery 32. The lamp 31 and drapery 32 do not enchance or contribute to the aesthetic appearance of the photograph 30A, but are within the field encompassed by the aperture 12 of the camera. Precisely this same photograph is taken by the camera 11 but with the device 10 attached thereto, and the results are illustrated in FIG. 3B in the photograph 30B. The subject 18B still appears at the center portion of the photograph and is a faithful reproduction of the subject as seen by the camera without distortion. The objects 31 and 32 present in the photograph 30A are not generally visible in the photograph 30B because they lie within the secondary field of incident light which is diffused by the tube 19 to effect the vignette shown in photograph 30B in which only the center portion of the photograph (i.e., the subject 18B) is clear and it shades off gradually into the surroundings.

Assuming the case in which external light is incident upon the tube 19 generally along the exterior of the cylindrical surface thereof but not elsewhere, the outward shadings from the center or subject-containing portion of the photograph 30B are relatively light and appear somewhat cloud-like largely in the nature of diffuse light. FIG. 3B generally depicts the case in which there is an abundance of light of this type. However, should any external light source, and especially a restricted source, be so situated with respect to the tube 19 that at least a portion of the light is incident on the inner surface of the tube through the open end thereof, a general halo of light then appears about the image 18B. A plurality of such light sources at different locations will result in halos appearing at spaced intervals along the tube toward the inner attachment end thereof. In this case, then, the vignette not only constitutes a general shading of the photograph away from the image 18B, but such shading includes a plurality of spaced-apart somewhat circumjacent halos of light producing a most attractive aesthetic effect, such as the partial halos 22b and 22b' in FIG. 3B respectively constituting reflections of the rays 22 and 22' in FIG. 2.

Figure 5:
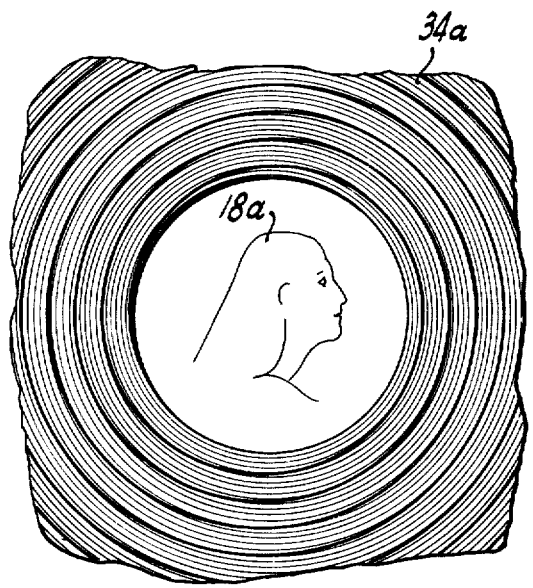
FIG. 5 is a representation of a photograph using the device shown in FIG. 4.
Figure 7:
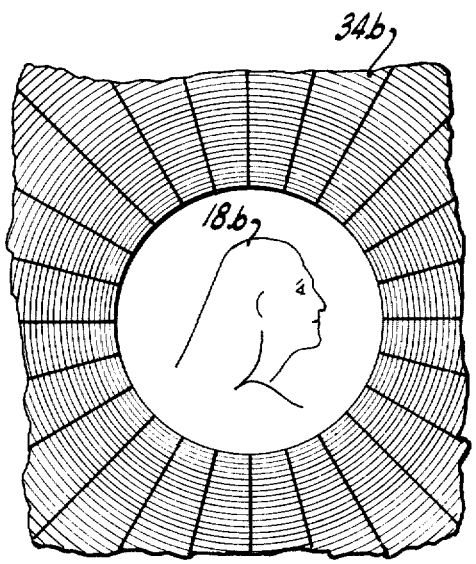
FIG. 7 is a representation of a photograph using the device of FIG. 6.
Figure 6:
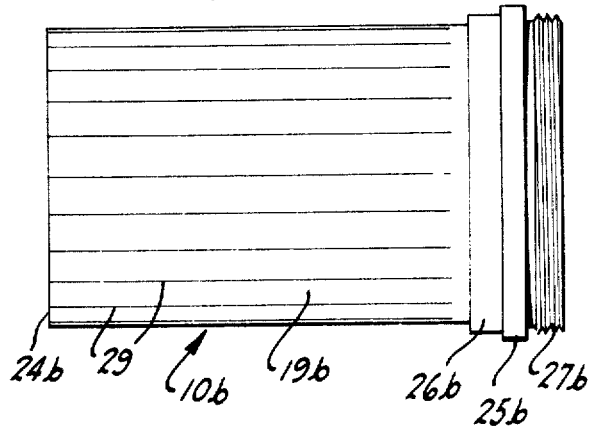
FIG. 6 is a side view in elevation of a further modified form of the device.

FIGS. 5 and 7 respectively depict portions of photographs 34a and 34b taken by the camera 11 with the devices 10a and 10b respectively attached thereto as shown in FIGS. 4 and 6. The photograph 34A results in a vignette generally similar to that shown in FIG. 3B, but the shadings produced about the subject 18a is somewhat spiral-like as a result of the light-interferring helical marking 28 along the tube 19a. Otherwise, the photographic vignette 34a is substantially the same as that illustrated in FIG. 3B with the subject being sharply reproduced and the area surrounding the same shading outwardly therefrom.

Analagously, the photographic vignette 34b taken by use of the device 10b shown in FIG. 6 provides a clear, high fidelity reproduction of the subject 18b with the outwardly shading surroundings containing converging lines enforced thereon by the striations 29 formed along the outer surface of the tube 19b. The striations present in the photograph 34b appear to converge toward a vanishing point and further highlight and direct attention to the photographic recording of the subject 18b. As stated, the general appearance of the vignette shading as determined by the particular device used and characteristics thereof may or may not include the previously described overtones of light halos and a general appearance of shading light depending upon the presence and location of any external light source.

The length and diameter of the tube 19 depend upon the size of the picture and subject 18 to be captured therein and somewhat on the camera lens with longer range lenses requiring shorter tubes. By way of specific example considering the aforementioned Hasselblad camera and Zeiss lens, the tube 19 illustrated in FIG. 2 is approximately full size, therefore having an outer diameter of approximately 2 inches, a wall thickness approximating ⅛ of an inch, and a length from the outer to the inner ends thereof of approximately 3½ inches. The exemplary tube is formed of translucent plastic (Lucite being a specific instance), and both clear and tinted are acceptable. A device 10 and tube 19a of such dimensions has been found to produce excellent photographic vignettes. In addition to the surface configurations described, the surface of the tube 19 might be partially or completely provided with reflective materials to alter the character of the vignette, and in this respect, the inner surface of the tube 19 might be half silvered so that a portion of the light incident on the surface will pass therethrough and other portions be reflected as indicated by the ray 22.

The forgoing description will be seen to include a method of taking photographic vignettes with a camera having an image-forming aperture and a focal plane. The method incorporates the steps of focusing the camera 11 on a subject so that incident light therefrom enters the aperture 12 and it is directed thereby toward the focal plane containing the film 17 to expose the film to the image. The incident light traveling from the vicinity of the subject 18 toward the aperture 12 is divided into primary and secondary fields the latter of which may contain various components with one of which, when included, generally bounding the primary field and merging therewith. The character of the incident light forming the secondary field is changed prior to its reaching the aperture 12 in a manner such that the photographic reproduction of the subject shades outwardly therefrom to produce a photographic vignette. The camera is advantageously focused through an aperture or light stop 15 that is open at least to the extent that the resultant depth of field does not include the outer end portion 24 of the tube 19 so as to reproduce the same at the focal plane and thereby record the end portion of the tube on the film 17. The character of the secondary field is changed, it will be observed, without substantial change occurring in the primary field representing the center portions of the photographic vignettes.

Use of the device 10 is simple and convenient. Whenever it is desired to make a photographic vignette, the device 10 is attached to the camera 11 as explained, and the camera is focused in the ordinary manner. With a single lens reflex camera, the image observed by one using the camera is that appearing at the aperture 12 so that the photographer can be certain that the desired image area remains clear and unobstructed. After the picture is taken, the device 10 is quickly and easily removed and the camera is again ready for conventional use. The camera is focused and otherwise adjusted in the standard manner, keeping in mind the desirability of having the light stop open as previously described.

As previously stated, the geometric optics depicted in FIG. 2 are a greatly simplified statement of the phenomena that occurs, and it neglects factors of refraction and the fact that light incident on a light-transmitting surface will be divided into both reflected and transmitted components. It also ignores the complexity enforced on reflection by a curvilinear surface. Irrespective of the finite accuracy of the theorized technical explanation, the results attained and techniques used to achieve the same are explicitly correct.

While in the foregoing specification, embodiments of the invention have been set forth in considerable detail for purposes of making a complete disclosure thereof, it will be apparent to those skiled in the art that numerous changes may be made in such details without departing from the spirit and principles of the invention.

What is claimed is:

1. A method of taking photographic vignettes with a camera having an image-forming aperture and a focal plane, comprising the steps of: focusing the camera on a subject so that incident light therefrom enters said aperture and is directed thereby toward said focal plane to expose a photographic film disposed thereat; dividing incident light traveling directly from the vicinity of such subject toward said aperture into primary and secondary fields; concurrently refracting and reflecting the incident light forming said secondary field prior to its reaching said aperture to change the original character of the incident light forming said secondary field; and producing a vignette-type background generally about the subject on a photographic film disposed along the focal plane of such camera by directing said secondary field to the focal plane of such camera.

2. The method of claim 1 in which the incident light is divided prior to its reaching said image-forming aperture.

3. The method of claim 1 in which said secondary field of incident light includes at least one component that generally bounds the primary field and merges therewith, and in which the concurrent steps of refracting and reflecting the secondary field includes intercepting the incident light defining the same and diffusing the intercepted light.

4. A device for producing photographic vignettes at the focal plane of a camera having an image-forming aperture through which incident light is directed toward such focal plane to expose a photographic film disposed thereat, comprising: an elongated, generally hollow tube having a cross-sectional area greater than that of such aperture to enable the tube to be disposed in surrounding relation therewith, and effective to divide incident light travelling from the vicinity of a subject into primary and secondary fields, said tube being substantially light transmitting to enable the secondary field of incident light generally bounding the aforementioned primary field to refract through the walls of the tube and be influenced thereby, said tube having light-interferring markings therealong; and attachment means adjacent one end of said tube removably securing the same to such camera adjacent the image-forming aperture thereof so that the primary field of incident light passes through the interior of said tube to reach such aperture and be reproduced therethrough as an essentially high fidelity replica of the subject and so that the secondary field of incident light is altered by said tube prior to reaching said aperture.

5. The device of claim 4 in which said markings include a generally helical groove extending along said tube.

6. The device of claim 4 in which said markings include axially extending striations formed therealong.

7. The device of claim 4 in which said tube is generally cylindrical in cross-section.

8. The device of claim 4 in which said attachment means comprises an adaptor fixedly secured to said tube and adapted to be removably secured to a camera as aforesaid.

9. The device of claim 8 in which said tube is translucent to enable a secondary field of incident light generally bounding the aforementioned primary field to pass through the walls of the tube and be diffused thereby.

10. The device of claim 9 in which the end portion of said tube opposite the attachment means terminates in a generally flat edge to provide a surface area upon which external light may be incident.

11. The device of claim 4 in which said secondary field of incident light is altered by reflection prior to reaching said aperture.

12. The device of claim 4 in which said secondary field of incident light is altered by refraction and reflection prior to reaching said aperture.

* * * * *